US012382395B2

(12) United States Patent
Alpert et al.

(10) Patent No.: US 12,382,395 B2
(45) Date of Patent: Aug. 5, 2025

(54) OPEN LOOP WAKE-UP RADIO BASED ON TRANSMITTER FINGERPRINTING

(71) Applicant: TEXAS INSTRUMENTS INCORPORATED, Dallas, TX (US)

(72) Inventors: Yaron Alpert, Hod HaSharon (IL); Matan Ben-Shachar, Kibbutz Givat Haim Ihud (IL); Oren Aharon Shani, Kfar-Saba (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/498,802

(22) Filed: Oct. 31, 2023

(65) Prior Publication Data
US 2024/0064640 A1 Feb. 22, 2024

Related U.S. Application Data

(63) Continuation of application No. 17/712,236, filed on Apr. 4, 2022, now Pat. No. 11,844,020, which is a
(Continued)

(51) Int. Cl.
*H04W 52/02* (2009.01)
*H04W 4/70* (2018.01)

(52) U.S. Cl.
CPC ......... *H04W 52/0229* (2013.01); *H04W 4/70* (2018.02); *H04W 52/0274* (2013.01)

(58) Field of Classification Search
CPC H04W 52/0229; H04W 4/70; H04W 52/0274
See application file for complete search history.

(56) References Cited

U.S. PATENT DOCUMENTS

| 11,297,573 B2 | 4/2022 | Alpert et al. |
| 2019/0246072 A1 | 8/2019 | Siann et al. |

(Continued)

FOREIGN PATENT DOCUMENTS

| EP | 2833680 A1 | 2/2015 |
| JP | 2018148579 A | 9/2018 |

OTHER PUBLICATIONS

Shi, Zhiyuan et al. Transient-Based Identification of 802.11b Wireless Device. 2011 International Conference on Wireless Communications and Signal Processing (WCSP), 2011, IEEE, 5 pages.
(Continued)

*Primary Examiner* — Diane D Mizrahi
(74) *Attorney, Agent, or Firm* — Michelle F. Murray; Frank D. Cimino

(57) ABSTRACT

A device (e.g., an IoT device) includes a first radio, and a memory device accessible to the first radio. The memory device is configured to store a fingerprinting feature for a specific transmitter device. A second radio and a processor are also included. The process is coupled to the first and second radios. The first radio is configured to extract a fingerprinting feature of a first received wireless signal, determine that the extracted feature matches the fingerprinting feature stored in the storage device, and responsive to the determination that the extracted feature matches the feature stored in the storage device, cause the second radio to transition from a lower power state to a higher power state of operation and continue to receive the incoming signal.

21 Claims, 2 Drawing Sheets

Related U.S. Application Data continuation of application No. 16/858,119, filed on Apr. 24, 2020, now Pat. No. 11,297,573.

(56) References Cited

U.S. PATENT DOCUMENTS

2019/0364492 A1 11/2019 Azizi
2022/0381868 A1* 12/2022 Ben-Shachar ............ G01S 3/72

OTHER PUBLICATIONS

Radhakrishnan, Sakthi Vignesh et al. "GTID: A Technique for Physical Device and Device Type Fingerprinting." IEEE Transactions on Dependable and Secure Computing, vol. 12, No. 5. Sep./Oct. 2015, pp. 519-532.

Lin, Yun et al. "Improving Wireless Devices Identification Using Gray Relationship Classifier to Enhance Wireless Network Security." 2018 IEEE Conference on Computer Workshops: MobiSec 2018: Security, Privacy, and Digital Forensics of Mobil Systems and Networks, pp. 421-425.

Dalai, Asish Kumar et al. "A Fingerprinting Technique for Identification of Wireless Devices." May 2018, https://resarchgate/net/publicaiton/324965618. [2018 International Conference on Computer, Information and Telecommunication Systems (CITS)].

Hua, Jingyu et al. "Accurate and Efficient Wireless Device Fingerprinting Using Channel State Information." IEEE Infocom 2018—IEEE Conference on Computer Communications, pp. 1700-1708.

Chatterjee, Baibhab et al. "RF-PUF: IoT Security Enhancement Through Authentication of Wireless Nodes Using In-situ Machine Learning." 2018 IEEE International Symposium on Hardware Oriented Security and Trust (HOST), 4 pages.

Rehman, Saeed Ur et al. "The Analysis of RF Fingerprinting for Low-End Wireless Receivers with Application to IEEE 802.11a." 2012 International Conference on Selected Topics in Mobile and Wireless Networking, pp. 24-29.

Gu, Tianbo et al. "BF-IoT: Securing the IoT Newtorks Via Fingerprinting-based Device Authentication." 2018 IEEE 15th International Conferene on Mobile Ad-Hoc and Sensor Systems, pp. 254-262.

Rehman, Saeed Ur et al. "Analysis of Impersonation Attacks on Systems Using RF Fingerprinting and Low-End Receivers." Journal of Computer and Systems Sciences 80(2014). pp. 591-601.

Khodzhaev, Zulfidin et al. "Device Fingerprinting for Authentication." ELECO 2018, pp. 193-197.

Uzundurukan, Emre et al. "Design of Low-Cost Modular RF Front End for RF Fingerprinting of Bluetooth Signals." 2017 25th Signal Processing and Communications Applications Conference, 2017 IEEE, 4 pages.

Hutu, Florin et al. "A New Wake-Up Radio Architecture for Wireless Sensor Networks." Article in EURASIP Journal on Wireless Communications and Networking, Oct. 2014, pp. 1-14.

Kennedy, Irwin O. et al. "Radio Transmitter Fingerprinting" A Steady State Frequency Domain Approach. 2008 IEEE 68th Vehicular Technology Conference, 5 pages.

* cited by examiner

OPEN LOOP WAKE-UP RADIO BASED ON TRANSMITTER FINGERPRINTING

CROSS-REFERENCE TO RELATED APPLICATIONS

This application is a continuation of U.S. patent application Ser. No. 17/712,236, filed Apr. 4, 2022, which is a continuation of U.S. patent application Ser. No. 16/858,119, filed Apr. 24, 2020, now U.S. Pat. No. 11,297,573, which applications are incorporated by reference herein in its entirety.

BACKGROUND

One challenge in a wireless network that includes battery-operated devices is battery life. One type of wireless device is an Internet-of-Things (IoT) device. IoT devices often have a sensor usable to monitor an environmental condition (e.g., temperature), the operating state of a machine, or other type of condition. IoT devices generally are "headless" meaning that they have no direct user input/output capability (e.g., no keyboard, no display, etc.). IoT devices are often battery-operated and are installed within an environment or machine and are not intended to be directly accessed by a user. Many applications for the use of IoT devices benefit from the IoT devices' batteries lasting a long time (e.g., years).

SUMMARY

In at least one example, a device includes a first radio, and a memory device accessible to the first radio. The memory device is configured to store a feature for a specific transmitter device. A second radio and a processor are also included. The process is coupled to the first and second radios. The first radio is configured to extract a feature of a first received wireless signal, determine that the extracted feature matches the feature stored in the storage device, and responsive to the determination that the extracted feature matches the feature stored in the storage device, cause the second radio to transition from a lower power state to a higher power state of operation.

BRIEF DESCRIPTION OF THE DRAWINGS

For a detailed description of various examples, reference will now be made to the accompanying drawings in which.

DETAILED DESCRIPTION

Figure 1:
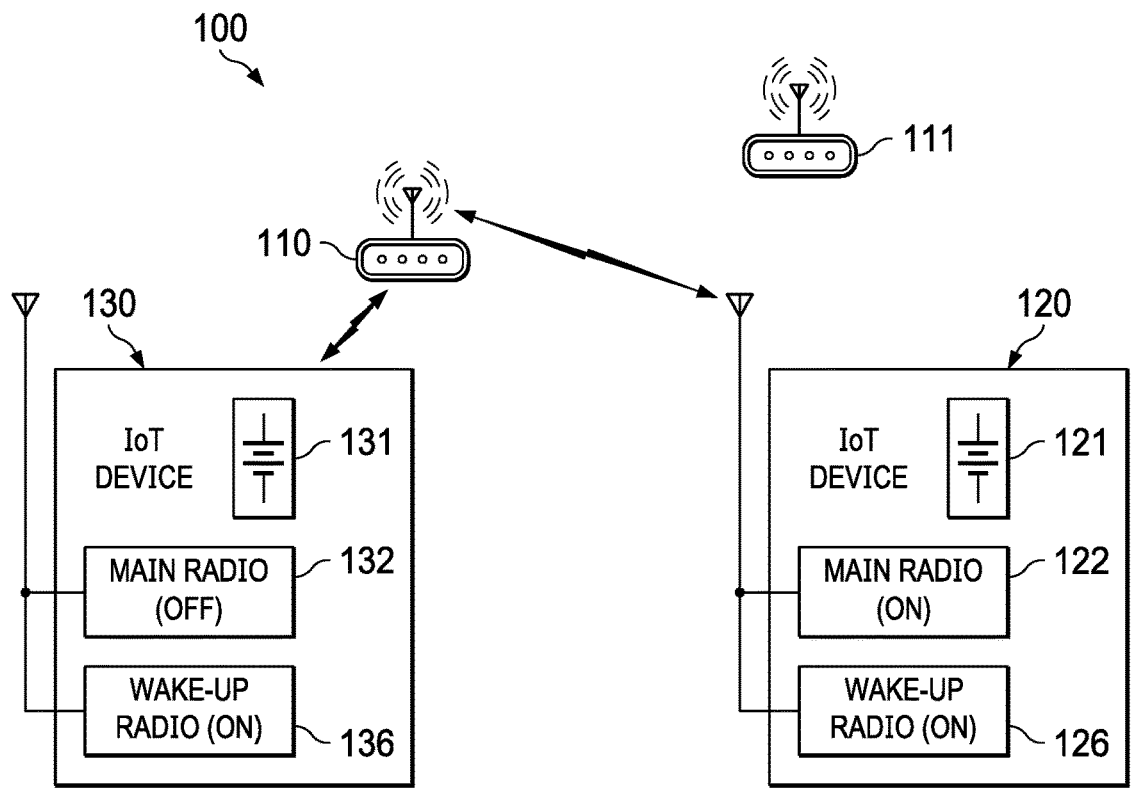
FIG. 1 illustrates a wireless network including IoT devices in accordance with an example.

Some battery-powered wireless devices include a "main" radio and a "wake-up" radio. The main radio is used to transmit and/or receive data in accordance with the device's runtime operation. The main radio can enter a low power state (e.g., a sleep state, hibernation state, etc.) during periods of non-use. The wake-up radio receives wireless signals from transmitters in the wireless network to determine when to wake-up the main radio. Wake-up radios may operate in an "open loop" configuration or a "closed loop" configuration. A closed-loop wake-up radio is preconfigured to recognize, for example, a certain sequence of symbols from a transmitter, or negotiates with the transmitter for the transmitter-specific sequence of symbols. Closed-loop wake-up radios and transmitters may follow a particular wireless protocol that determine and/or negotiate a wake-up signal. The negotiation of the wake-up signal is in addition to the data and message signaling.

Although wireless devices operate according to applicable standard protocols (e.g., IEEE 802.11, Bluetooth Low Energy, etc.), a wireless transmitter within a given wireless network can be distinguished from other wireless transmitters due to imperfections in the analog components of the transmitter. Such imperfections may result from randomness introduced during the manufacturing of the components of the transmitters (e.g., digital-to-analog converters, filters, frequency mixers, power amplifiers, etc.). For example, the threshold voltage or on-resistance of metal oxide semiconductor field effect transistors (MOSFETs) may vary slightly from transistor to transistor even though the transistors are made in accordance with the same process steps. Such non-linear effects result in each transmitter having a unique "fingerprint." Thus, radio frequency (RF) fingerprinting can be used by a receiver to identify a specific transmitter from among other possible transmitters to thereby wake-up the main radio. Waking up the main radio based on an RF fingerprint is an "open-loop" process in that a negotiation of a particular set of symbols between transmitter and receiver is not required. That is, a wake-up signal (generated internal to the wireless device) to wake a main radio in response to an aspect of a specific transmitter (an extracted "feature") is generated based on the transmitter's standard transmission without adding any specific/integrated wake-up signal to the normal data transmission protocol. The receiver determines the RF fingerprint of a transmission that uniquely identifies a particular transmitter with which the receiver is to associate, and then uses that extracted feature to only wake-up the main radio when the valid feature is detected, for example, the extracted feature matches a feature stored in the radio's memory). The transmission being fingerprinted may also include an identifier of the IoT device(s) that the transmitter wants to wake. Fingerprinting a transmission with the IoT device-specific identifier will cause only that particular IoT device to wake its main radio when a future transmission with the relevant fingerprint is detected.

The disclosed examples are directed to a battery-powered, Internet-of-Things (IoT) devices that include a main radio and a wake-up radio. The main radio is used by the IoT device to transmit and/or receive data in accordance with its runtime operation. In one example, the battery-powered IoT device may have one or more integrated or external sensors, and the IoT device's main radio is used to transmit sensor data or event information to the wireless network. To save battery power, the main radio transitions to a lower power state (e.g., a sleep or hibernation state). While in the lower power state, the main radio is not usable to send or receive wireless signals. Instead, the main radio must be woken up for that purpose. The wake-up radio employs RF fingerprinting (i.e., a temporary "feature") to detect when a valid transmitter (e.g., an access point) is attempting to communicate with the IoT device containing the wake-up radio. In this context, a valid transmitter is a transmitter to which the IoT device is paired and with which the IoT device should communicate. When the wake-up radio detects a valid fingerprint, the wake-up radio causes the main radio to wake up (i.e., transition from the lower power state to the higher power state) and to continue decoding the received wireless signal to thereby be capable of runtime operations such as transmitting sensor data, receiving wireless communications from the transmitter, etc. The wake-up radio described herein thus employs RF fingerprinting (e.g., comparing a newly extracted feature to one or more features stored in memory) to wake up the main radio. Because the wake-up event is generated while also receiving data in the course of normal operations (i.e., there is no dedicated wake-up signal), a negotiation of a specific set of dedicated wake-up symbols between transmitter and receiver according to a specific protocol is not needed for the open-loop wake-up radio described herein.

FIG. 1 shows an example of a wireless network 100 including access points 110 and 111 and IoT devices 120 and 130. Any number of IoT devices (one or more) can be included within the wireless network 100. In this example, each IoT device includes a battery, a main radio and a fingerprinting wake-up radio (WUR). IoT device 120 includes a battery 121, a main radio 122, and a fingerprinting wake-up radio 126. Similarly, IoT device 130 includes a battery 131, a main radio 132, and a fingerprinting wake-up radio 136. During extended periods of non-use, the main radios 122, 132 of the IoT devices 120, 130 are turned off to save battery power. However, the fingerprinting wake-up radios 122, 132 remain continuously powered on. In the configuration of FIG. 1, main radio 132 in IoT device 130 is turned off. The wake-up radio 126 in IoT device 120 has detected a valid fingerprint from a wireless signal transmitted by access point 110 (e.g., has extracted a feature from the wireless signal and determined that the feature matches a feature stored in the radio's memory). In response to detection of a valid fingerprint, the wake-up radio 126 causes the main radio 122 in IoT device 120 to wake to complete the reception on the arriving wireless signal (e.g., powered on or otherwise transitioned to a higher power, fully operational state). The wake-up radio 136 in IoT device 130 is not configured to recognize the same RF fingerprint as wake-up radio 126 (e.g., the feature extracted by wake-up radio 136 does not match any features stored in that radio's memory), and thus the main radio 132 in IoT device 130 remains in a low power state (e.g., sleep, hibernation, etc.). Instead, the wake-up radio 136 of IoT device 130 may be configured to recognize an RF fingerprint derived from access point 111.

Figure 2:
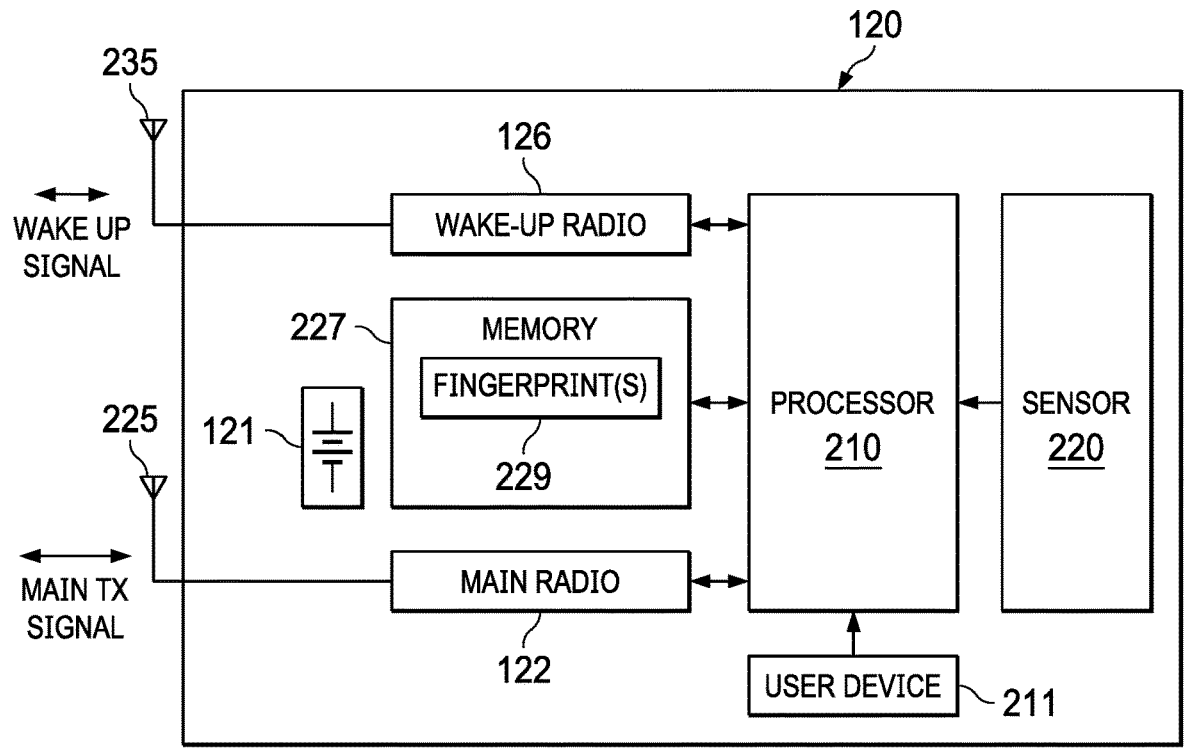
FIG. 2 shows an example implementation of an IoT having a wake-up radio.

FIG. 2 shows additional detail regarding the implementation of IoT device 120, but the same architecture may apply to IoT device 130 and/or other IoT devices in the wireless network 100. In this example, IoT device 120 includes battery 121, main radio 122, fingerprinting wake-up radio 126, a processor 210, a sensor 220, and a memory device 227. The main and fingerprinting wake-up radios 122 and 126 as well as sensor 220 are coupled to processor 210. The battery 121 provides operating power for some or all of the active components with in the IoT device 120. While one processor 210 is shown in this example, more than one processor can be provided in other implementations. Similarly, more than one sensor 220 can be provided as well. The sensor 220 is application-specific. Examples of sensor 220 include a temperature sensor, a current sensor, a voltage sensor, etc.

Each radio 122, 126 is coupled to an antenna. Main radio 122 is coupled to antenna 225, and wake-up radio 126 is coupled to antenna 235. Each radio thus may be connected to its own antenna. In other example, one antenna or antenna array is shared between the two radios 122, 126. As noted above, the main radio 122 is used for a different purpose than the fingerprinting wake-up radio. The main radio 122 is used to exchange (send and/or receive) wireless signals with an access point during device run-time. For example, the main radio 122 may be used to receive a request from an access point (e.g., access point 110) for a sensor reading, send data and/or signals from sensor 220 to the access point (e.g., access point 110), etc. In an implementation in which IoT device 120 responds to requests received from an access point, the main radio 122 in the IoT device may be powered off following transmission/reception of information to the access point as the IoT device awaits another request from the access point. Alternatively, the main radio 122 may be powered down following a predefined period of time of non-use (e.g., 30 second, 2 minutes, etc.).

The fingerprinting wake-up radio 126 remains continuously powered on and operational in at least some implementations and is used to detect a valid fingerprint from an access point's standard wireless signals. In response to detection of a valid RF fingerprint, the main radio 122 is caused to be transitioned from the lower power state to the higher power state in order to receive the incoming signal.

RF fingerprinting can be performed based on the following illustrative categories: transient-based RF fingerprinting and steady-state based RF fingerprinting generation. In transient-based RF fingerprinting generation, a transmitter transmitting from its off to on states triggers a unique transient feature within the transmitted wireless signal which appears before the transmission of the actual packet of data. In steady-state based RF fingerprinting generation, unique features are present in the transmitter's wireless signal during the modulation phase. In this case, the fingerprinting wake-up radio generates the fingerprint from at least one received symbol. Any of numerous different types of RF fingerprinting techniques can be implemented by an IoT device to validate a transmitter. Validating the transmitter means that the IoT device confirms whether a wireless signal the IoT device receives is from a transmitter with which the IoT device is associated (e.g., paired) and the extracted feature matches a feature already stored in the device's memory).

One example of transient-based RF fingerprinting includes the determination of the power spectral density (PSD) of the preamble in, for example, an IEEE 802.11a preamble. In this particular RF fingerprinting technique, the PSD is characterized by PSD coefficients, which can be calculated as:

$$PSD_X(k) = \frac{|X(k)|^2}{\sum_{k=1}^{K} |X(k)|^2}$$

where X(k) are the coefficients of a discrete Fourier transform of the input signal x(m) and are given by:

$$X(k) = \frac{1}{N_F} \sum_{m=1}^{N_F} x(m) e^{\left[\frac{-2\pi j}{N_F}(m-1)(k-1)\right]}$$

The PSD of a wireless signal received from a transmitter can be used to uniquely identify the transmitter. That is, the PSD varies between transmitters and is generally repeatable for a given transmitter. The fingerprinting wake-up radio described herein is usable to determine the PSD for an incoming wireless signal. The PSD for one or more transmitters to which an IoT device is associated is stored in memory 227 within the IoT device as fingerprint(s) 229. The PSD determined for a given wireless signal can be compared to the PSD(s) stored in memory within the IoT device to determine whether a valid transmitter is attempting to communicate with the IoT device. If the PSD computed by the IoT device matches a PSD stored in the IoT device's memory, then the main radio is caused to be transitioned from its lower power state to its higher power state (i.e., awakened).

The fingerprint(s) 229 stored in memory 227 may be provided to or otherwise determined by the IoT device 120 in accordance with any suitable technique. In on example, a user device 211 is coupled to the processor 210 and can be used to indicate to the processor 210 that the processor 210 is to enter a training mode in which the processor 210 determines a fingerprint of a wireless signal it receives and store the fingerprint in memory 227 for subsequent use to enable the main radio 122. In another example, a user can program one or more fingerprints 229 via a graphical user interface implemented on a computer system external to the IoT device 120 and cause the external computer system to transmit the fingerprint to the IoT device for storage in memory 227.

Figure 3:
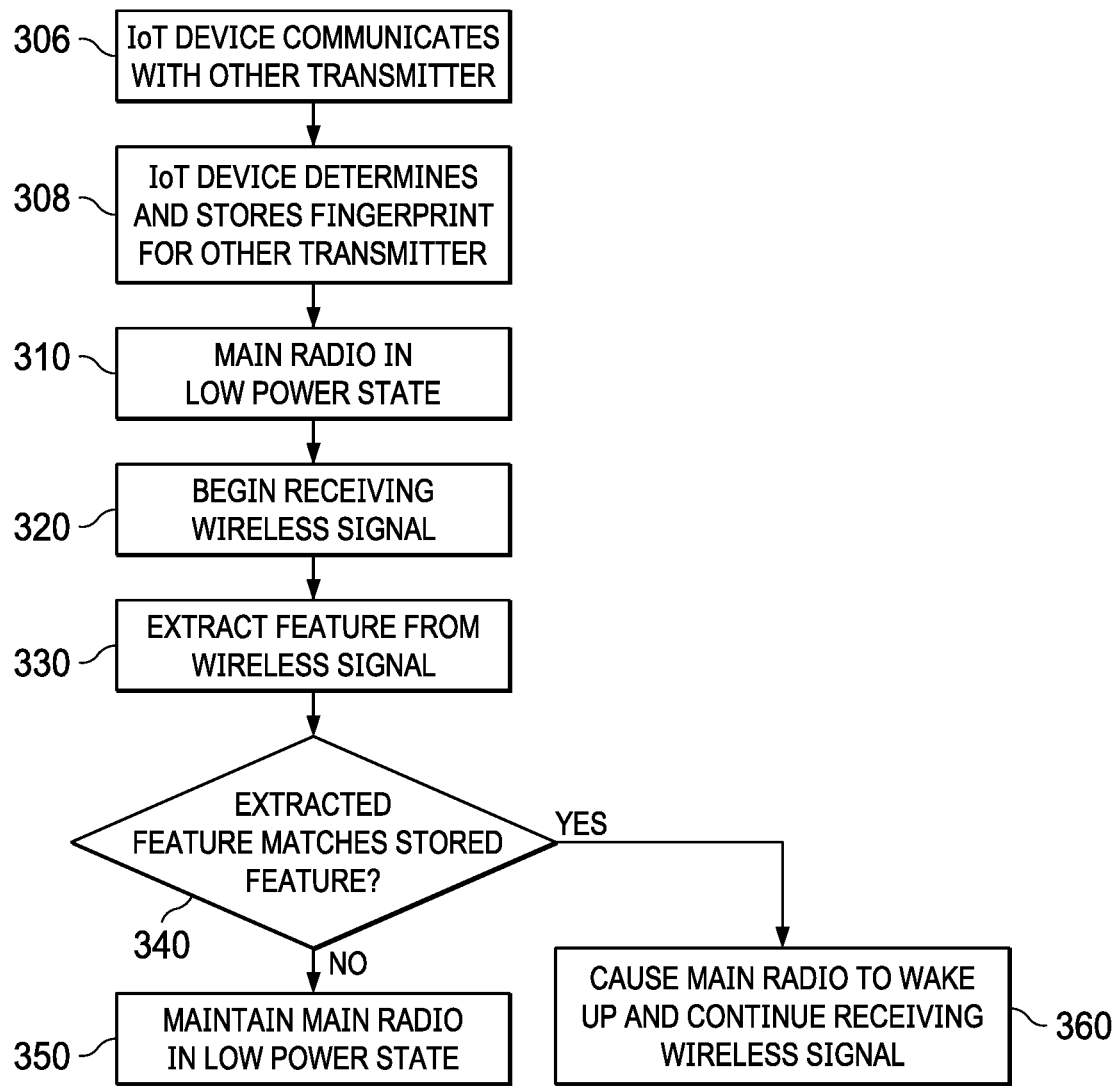
FIG. 3 shows an example of a method for an IoT device to validate an access point based on a feature extracted from a wireless signal.

FIG. 3 illustrates an example of a method performed by an IoT device (e.g., IoT device 120) to validate a transmitter by way of RF fingerprinting. At 306, the IoT device communicates with the other transmitter and, at 308, determines and stores a fingerprint of the transmitter. Fingerprint techniques such as those described above can be employed. The main radio 122 of the IoT device may be awake during steps 306 and 308 and may be used to provide signals from the transmitter to the IoT device's processor 210 for determination of the fingerprint. The processor 210 may store the fingerprint in memory 227.

At 310, the main radio 122 is transitioned to a low power state (e.g., sleep, hibernation). In one example, the processor 210 sends a signal to the main radio 122 to transition to the low power state following the main radio's use to reply to a request received from a transmitter. In another example, the processor 210 sends a signal to the main radio 122 to transition to the low power state upon timeout of a timer during a period of non-use of the main radio 122.

At 320, the fingerprinting wake-up radio (which remains on and operational) begins to receive a wireless signal. The wireless signal received may be from a valid or invalid transmitter. If the wireless signal is from a valid transmitter, the main radio 122 should be transitioned to its higher power (operational) state, but if the wireless signal is not from a valid transmitter, the main radio 122 should not be transitioned to its higher power state and thus remain in its low power state. As explained above, a valid transmitter is a transmitter to which the IoT device is paired and with which the IoT device should communicate. The wireless signal received at 320 may include reception of a preamble of an IEEE 802.11 message. Transitioning the main radio 122 to the higher power state may include one or more of: turning power on to the main radio, increasing the operational voltage to the main radio, clocking the main radio at a higher frequency, etc.

At 330, the method includes extracting a feature from the received wireless signal. In one example, the extracted feature includes a computation of the PSD of the received wireless signal as described above. The fingerprinting wake-up radio 126 may compute the PSD of the received wireless signal.

At 340, the method includes determining whether the extracted feature matches any features stored in memory 229 within the IoT device 120. In one implementation, the fingerprinting wake-up radio 126 makes this determination. In another example, the fingerprinting wake-up radio 126 provides the extracted feature to the processor 210, and the processor 210 compares the extracted feature to the feature(s) stored in memory 227. In either case, a comparison is made of the newly extracted feature to any features previously stored in memory 227. The extracted feature and the feature(s) stored in memory 227 may comprise PSDs of, for example, a preamble of wireless packet.

At 350, if the extracted feature does not match any feature(s) stored in memory 227, then the power state of the main radio 122 remains in the low power state, that is, the main radio 122 is not awakened.

At 360, if the extracted feature does match at least one feature stored in memory 227, the main radio is awakened and continues to decode the received signal. In one example, the fingerprinting wake-up radio 126 determines the match and sends a signal to processor 210 to awaken the main radio 122. In another example, the fingerprinting wake-up radio extracts the feature from the wireless signal at 330 and provides the feature to the processor 210, and the processor 210 determines a match exists and commands the main radio 122 to be transitioned to its higher power state (e.g., by providing an enable signal to the main radio 122). Once the main radio 122 is transitioned to its higher power state, the main radio continues receiving the incoming wireless signals and provides such signals to the processor 210 for further processing. While in the higher power state, the main radio 122 also can be used to transmit data (e.g., sensor data).

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A wireless device comprising:
   a radio circuit; and
   a processor configured to:
      while the radio circuit operates in a low power state,
         receive a first portion of a first wireless signal via the radio circuit,
         determine a first fingerprint based on the first portion of the first wireless signal,
         compare the first fingerprint with a reference fingerprint associated with a first device to determine whether the first wireless signal is associated with the first device, and
      in response to determining that the first wireless signal is associated with the first device, cause the radio circuit to transition to a high power state to receive a second portion of the first wireless signal.

2. The wireless device of claim 1, wherein the radio circuit comprises a wakeup radio and a main radio, wherein the processor is configured to receive the first portion of the first wireless signal via the wakeup radio and the second portion of the first wireless signal via the main radio.

3. The wireless device of claim 2, wherein the wakeup radio and the main radio are coupled to a same antenna terminal.

4. The wireless device of claim 2, wherein the wakeup radio is coupled to a first antenna terminal and the main radio is coupled to a second antenna terminal.

5. The wireless device of claim 2, wherein, when the radio circuit is in the low power state, the main radio is configured to be off and the wakeup radio is configured to be on.

6. The wireless device of claim 5, wherein, when the radio circuit is in the high power state, the main radio is configured to be on.

7. The wireless device of claim 6, wherein, when the radio circuit is in the high power state, the wakeup radio is configured to be on.

8. The wireless device of claim 1, further comprising a memory, wherein the processor is configured to:
receive a second wireless signal via the radio circuit, the second wireless signal associated to the first device;
determine the reference fingerprint based on the second wireless signal; and
store the reference fingerprint in the memory.

9. The wireless device of claim 1, wherein the first fingerprint is based on a power spectral density of the first portion of the first wireless signal.

10. The wireless device of claim 1, wherein the processor is configured to determine the first fingerprint from at least one symbol of the first portion of the first wireless signal.

11. The wireless device of claim 1, wherein the first portion of the first wireless signal comprises a preamble of a packet, and wherein the processor is configured to determine the first fingerprint from the preamble of the packet.

12. The wireless device of claim 11, wherein the packet is a packet according to an IEEE 802.11 protocol.

13. The wireless device of claim 1, wherein the first wireless signal does not include dedicated wakeup symbols.

14. The wireless device of claim 1, wherein the processor is configured to receive the first portion of the first wireless signal after the first device has been paired with the wireless device.

15. The wireless device of claim 1, further comprising a sensor, wherein the processor is configured to, after the radio circuit transitions to the high power state, transmit sensor data using the radio circuit.

16. A method comprising:
receiving a first portion of a first wireless signal via a radio circuit of a wireless device;
determining a first fingerprint based on the first portion of the first wireless signal;
comparing the first fingerprint with a reference fingerprint associated with a first device to determine whether the first wireless signal is associated with the first device; and
in response to determining that the first wireless signal is associated with the first device, causing the radio circuit to transition to a high power state to receive a second portion of the first wireless signal.

17. The method of claim 16, further comprising:
receiving a second wireless signal via the radio circuit, the second wireless signal associated to the first device;
determining the reference fingerprint based on the second wireless signal; and
storing the reference fingerprint in a memory.

18. The method of claim 16, wherein the first fingerprint is based on a power spectral density of the first portion of the first wireless signal.

19. The method of claim 16, wherein determining the first fingerprint comprises determining the first fingerprint from at least one symbol of the first portion of the first wireless signal.

20. The method of claim 16, wherein the first portion of the first wireless signal comprises a preamble of a packet, and wherein determining the first fingerprint comprises determining the first fingerprint based on the preamble of the packet.

21. The method of claim 16, wherein the first wireless signal does not include dedicated wakeup symbols.

* * * * *